Ahlgren 455/13

[15] 3,667,043
[45] May 30, 1972

[54] CONSTANT GAIN BANDWIDTH PRODUCT COMMUNICATION SATELLITE REPEATER

[72] Inventor: James D. Ahlgren, McLean, Va.

[73] Assignee: Telcom, Inc., McLean, Va.

[22] Filed: Sept. 19, 1969

[21] Appl. No.: 859,282

[52] U.S. Cl. ..........325/3, 325/4, 325/62, 325/305, 325/366, 330/126

[51] Int. Cl. ..........H04b 7/20

[58] Field of Search ..........325/2, 3, 4, 56, 62, 65, 305, 325/366, 367, 368; 343/200, 205, 206, 207, 208; 330/124, 126, 84; 340/147 SC

[56] References Cited

UNITED STATES PATENTS 2,900,457 8/1959 Stull, Jr. ..........330/126
3,283,249 11/1966 Mitchell..........325/3
3,411,088 11/1968 Hutchison..........325/3

*Primary Examiner*—Benedict V. Safourek
*Attorney*—Rose & Edell

[57] ABSTRACT

A transponder is rendered capable of automatically adjusting its bandwidth to accommodate the applied input signal. The input signal is applied in parallel to a plurality of signal channels which include filters of differing bandwidths and amplifiers having nominal gains arranged such that the product of amplifier gain and filter bandwidth is the same for all channels. The signal levels from all channels are compared and that channel providing the signal of highest level is permitted to transmit and the others are inhibited. Inhibition of channels may take the form of automatic gain control of the channel amplifiers or selective gating by means of appropriate logic circuitry.

10 Claims, 3 Drawing Figures

INVENTOR
JAMES D. AHLGREN

BY Hurvitz & Rose
ATTORNEYS

INVENTOR
JAMES D. AHLGREN

BY Hurvitz & Rose
ATTORNEYS

CONSTANT GAIN BANDWIDTH PRODUCT COMMUNICATION SATELLITE REPEATER

BACKGROUND OF THE INVENTION

The present invention relates generally to communication links utilizing artificial earth satellites and, more particularly, to communication satellite repeater and transponder systems.

In the past, satellite communication systems have generally been designed to accommodate the specific requirements of either a broadband system or a narrowband system. That is, a broadband system is usually implemented to handle multichannel communications between large population centers or between major military commands, while narrowband systems having provision for a single channel or a small number of channels are generally utilized where a requirement of relay capability for relatively small amounts of data is presented. It will be apparent then that, in the design of satellite communication systems, conflicting demands may be and often are encountered between users having requirements for substantially different quantities of data. On the one hand, there is the need for the very broadband system; and on the other, the requirement by tactical users of relay capability for relatively small amounts of data (such as one voice channel or a few teleprinter channels), and who may require this capability between relatively small ground installations having antennas of limited size and limited transmitter power. If the communication satellite repeater is made broadband, or sufficiently so to accommodate the first requirement, and hard limiting is employed, the threshold imposed by the satellite bandwidth may be so high as to preclude use of the satellite by the smaller tactical users. In contrast, if the satellite repeater is designed to accommmodate the latter users, the bandwidth is insufficient to allow use for multi-channel communications between centers or commands requiring large quantities of data.

Accordingly, it is a principal object of the present invention to provide a single communication satellite repeater which is operationally compatible with both broadband communication systems and systems requiring one or more narrowband low threshold channels.

It is another object of the present invention to provide a repeater or transponder having a plurality of signal translating channels of differing bandwidths and capable of selectively passing signals through one or more of the channels according to the relative correspondence between channel bandwidths and signal bandwidths to permit access according to the requirements of the particular communication system user.

Accordingly, it is a further object of the present invention to provide repeaters or transponders for communication satellites in which access to one or more channels of the repeater or transponder is obtained by self-adjustment of the repeater to the bandwidth of the received signal.

Still another object is to provide a communication satellite repeater in which one or more of a plurality of parallel signal-translating channels is selected for signal transmission according to the relative bandwidth of each channel and the bandwidth of the incoming signal, by cutting off or reducing the gain of amplifiers, or other devices having controllable signal passing characteristics, in channels having bandwidths differing from the signal bandwidth.

A further object of the present invention is to provide a communication satellite repeater or transponder wherein signal is passed by one of a plurality of transmission channels having bandwidths which are successively and sequentially ordered in a geometric progression, each bandwidth centered about the same center frequency, and in which selection of the appropriate channel for signal translation is accomplished by deriving from each of the channels a voltage indicative of the relative difference between its bandwidth and the bandwidth of the incoming signal and thereafter combining these voltages in preselected combinations to produce a gating voltage for gating signal only via the channel of appropriate bandwidth.

SUMMARY OF THE INVENTION

Briefly describing one embodiment of the invention, the repeater or transponder comprises a plurality of parallel channels to which the incoming signal is simultaneously applied, each channel including a filter having a preselected bandwidth differing from bandwidths of the filters in each of the other channels, and an amplifier, having a gain inversely proportional to the bandwidth of the respective filter, for amplifying the output of the filter in the respective channels. The bandwidths of the filters are selected to correspond to the RF bandwidth of the signals to be accepted. An AGC voltage is developed from the output of each amplifier and that voltage subtracted from the sum (or from the peak voltage) of all of the AGC voltages so developed, to produce a difference voltage which is utilized for controlling the gain of the amplifier in the respective channel. In this manner, the amplifiers of all of the channels except that one having the output of greatest amplitude are either cut off or substantially reduced in gain, so that output signal is contributed by only the aforementioned one channel of appropriate bandwidth, without degradation of performance of the system by the presence of the filters and other components of the remaining channels.

In a second embodiment of the invention, each of a plurality of parallel channels is again provided with a filter, of bandwidth which differs from the bandwidths of the filters of each of the remaining channels, and with an amplifier, the output of which is utilized to develop a control voltage. In the first embodiment, however, the bandwidths of the several filters are widely different and may be centered inside or outside the bandwidths of the relatively wider band filters, while in the second embodiment, the filters are centered at a single frequency, but the filter bandwidths differ in accordance with a geometric progression. Again, each amplifier is provided with a gain inversely proportional to the bandwidth of its respective filter. The output of the filter-amplifier combination is rectified and the difference between pairs of these rectified outputs in adjacent channels is derived. For filters having bandwidths narrower than that of the incoming signal the rectified outputs are equal, hence, the difference is zero; whereas for filters of wider bandwidth than that of the received signal, the difference between adjacent filters is a constant, because of the geometric progression of filter bandwidths. The desired signal translation channel is that containing the narrowest filter which shows a rectified difference. Identification of that filter is achieved by a second subtraction process in which the difference between outputs of adjacent pairs of the first set of subtractors is developed, only one of the difference voltages so developed having a non-zero value, indicative of the location of the filter whose bandwidth is closest to, but narrower than, the bandwidth of the incoming signal. The non-zero difference signal is then utilized to gate the output of the channel containing that filter as the output of the repeater.

The above and still further objects, features, and attendant advantages of the present invention will become apparent from a consideration of the following detailed description of certain preferred embodiments thereof, especially when taken in conjunction with the accompanying drawings.

DESCRIPTION OF THE PREFERRED EMBODIMENTS

Figures 1, 3:
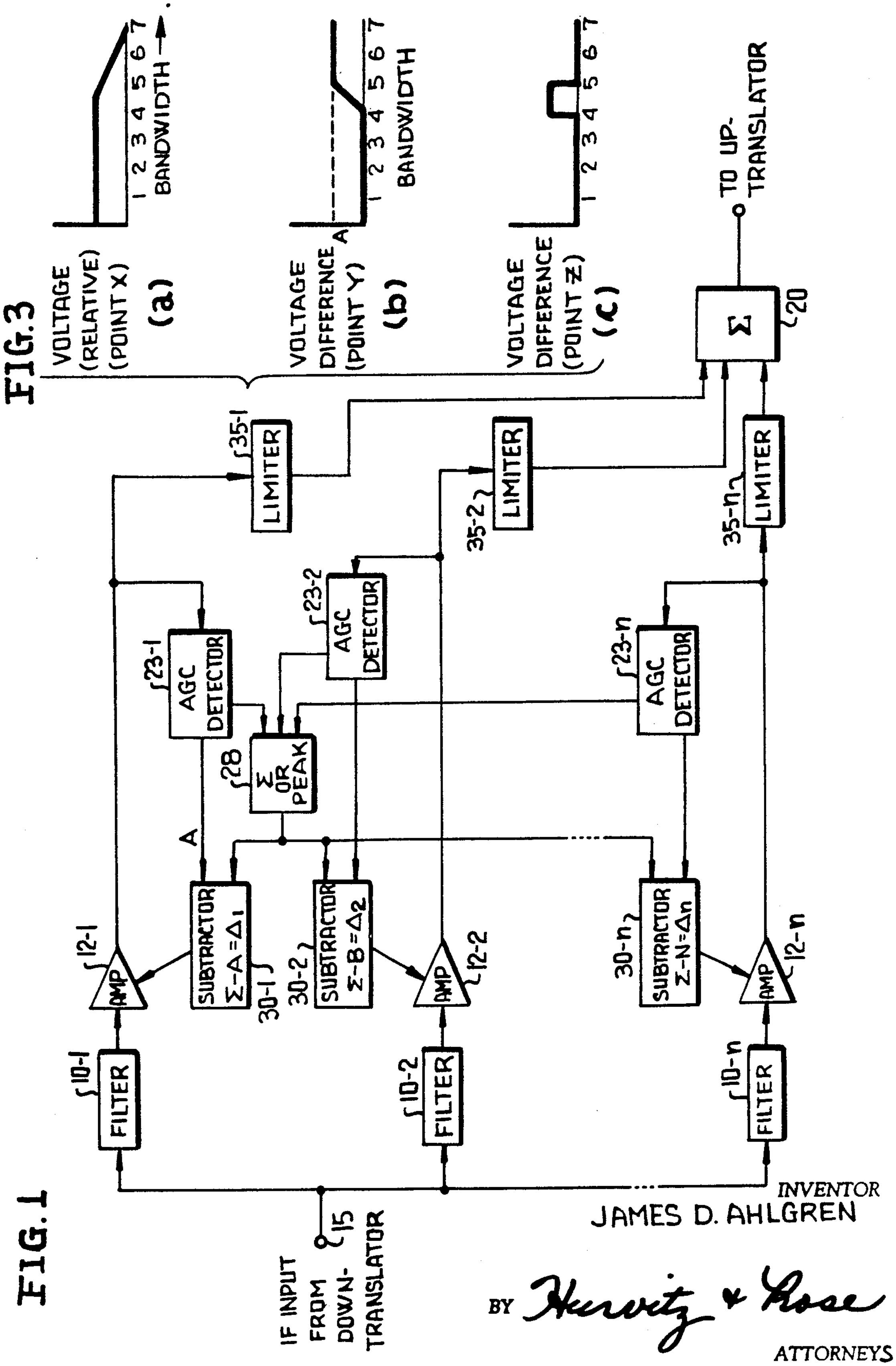
FIG. 1 is a block diagram of one embodiment of the present invention, utilizing filters of differing bandwidth and separated center frequencies.
FIGS. 3 (a), (b), and (c) are graphs indicating relative voltage versus bandwidth at preselected points in the circuit of FIG. 2.

Referring now to the drawings, one embodiment of a compatible multiibandwidth repeater, i.e., a repeater for providing compatible operation with either broadband or narrowband systems using the same communication satellite, according to the present invention, is shown in FIG. 1. A plurality of *n* filters, where *n* ≥ 2, designated 10–1, 10–2, . . ., 10–n, are coupled for parallel application of IF input signal, for example, from the front end or preceding circuitry, referred to in FIG. 1 as the down-translator. The bandwidth of each filter of the set of filters corresponds to the IF bandwidth of the signal to be accepted by that filter, the bandwidths of the several filters being vastly different from one another, i.e., being relatively wide or narrow according to the requirements imposed by the anticipated users of the communication system.

For the sake of simplicity and clarity the description of the repeater or transponder structure and its operation will initially be directed to the pair of channels containing filters 10–1 and 10–2, with subsequent discussion of the generalized structure and operation involving several channels. As stated above, the filters are of widely different bandwidth, and solely for the sake of example it will be assumed that filter 10–1 is of narrower bandwidth than filter 10–2. The narrower band may, however, be within the bandwidth of the wideband filter 10–2 or may be centered outside the wideband filter. The output signal from each filter is delivered to an associated intermediate frequency (IF) amplifier, 12–1 and 12–2 for filters 10–1 and 10–2, respectively, the amplifiers having their relative gains adjusted to be approximately in the inverse ratio of the filter bandwidths. If, for example, the gain of amplifier 12–1 is designated $K_1$ and the gain of amplifier 12–2, $K_2$, then $K_2=K_1\ BW_1/BW_2$, where $BW_1$ and $BW_2$ are the bandwidths of filters 10–1 and 10–2, respectively. This is simply a statement of the condition that the gains of the amplifiers are inversely proportional to the bandwidths of respective filter; or, more specifically, the product of the filter bandwidth and amplifier gain is the same for all n channels. Thus, the absence of signal at input terminal 15, renders the noise output powers of the amplifiers equal.

The output signals of the several amplifiers are fed to a summing circuit 20 where they are combined and then fed to other components of the satellite system, such as limiters, up-translators, or other circuitry, as required.

Each amplifier is provided with a conventional automatic gain control (AGC) circuit, including the AGC detectors 23–1 and 23–2 for amplifiers 12–1 and 12–2, respectively, so that an AGC voltage is derived from the output of each amplifier independently of the outputs of the remaining amplifiers. By way of example only, detector 23–1, 23–2, . . . 23–*n* may be of the type illustrated in FIG. 12–15 of "Radar System Engineering," Volume 1 of the Radiation Laboratory Series, published by McGraw-hill in 1947. Means are provided to cross-couple the AGC voltages so that the AGC voltage derived from amplifier 10–1 controls the gain of amplifier 10–2, and vice versa. To this end, each AGC voltage is applied to a single summing network or peak selector (detector) circuit 28, whose output is therefore representative of the sum of the several AGC voltages (in the case of a summing network) or of the largest value of AGC voltage (in the case of a peak selector) of the several voltages applied thereto. An example of a summing network suitable for the purposes of circuit 28 may be found in FIG. 1.7(c) and (d) of "Electronic Analog Computers" by Korn and Korn, published by McGraw-Hill in 1952. A peak detector suitable for element 28 may be found in FIG. 11–19 of "Electronic Circuits" by E. J. Angelo, Jr. published by McGraw-Hill in 1958. Each AGC voltage is fed to a separate respective subtractor, 30–1 and 30–2 for detectors 23–1 and 23–2, respectively, in the feedback circuit of the associated amplifier, along with the output of summing network or peak selector circuit 28. A circuit suitable for the functioning required of subtractors 30–1, 30–2, . . . 30–*n* may be found in FIG. 13–22 of the above-referenced text, "Electronic Circuits." Accordingly, the output of each subtractor is a voltage representative of the algebraic difference of the sum (or peak voltage) of the AGC voltages of the several channels and the AGC voltage developed in the particular channel in which that subtractor is located.

The gains of amplifiers 12–1, 12–2, . . . 12–*n* are varied in inverse proportion to the amplitude of the respective AGC feedback voltages; consequently, it will be apparent that when an amplifier is subjected to a large difference voltage, that amplifier is cut off or its gain substantially reduced relative to the gain of an amplifier to which a small difference voltage is applied. If, for example, a broadband signal is applied to terminal 15, the AGC voltage developed in channel 2 (i.e., the output signal of detector 23–2) is higher than that developed in channel 1, since by an earlier assumption, filter 10–2 has a wider bandwidth than filter 10–1. Therefore, the difference voltage derived by subtractor 30–1 is higher than that derived by subtractor 30–2. If only channels 1 and 2 are considered, and network 28 is a summing circuit, the output of subtractor 30–1 is equal, or substantially equal, to the AGC voltage developed as an output signal of detector 23–2. A similar situation would exist, under these conditions, for the output signals of subtractor 30–2 and detector 23–1, so that two-channel operation may be simplified by direct application of an AGC voltage developed by one channel to the AGC amplifier of the other channel. In general, however, several channels will be involved, precluding such direct cross-connection. In any event, the higher AGC voltage applied to amplifier 12–1 results in complete or substantial dominance by channel 2 for signal translation, i.e., contribution of all or by far the greater part of the overall output signal.

Conversely, continuing with the immediately preceding example of relative bandwidths of filters 10–1 and 10–2, the presence at terminal 15 of a narrow band signal centered in channel 1 results in the development of an AGC voltage in that channel exceeding the AGC voltage of channel 2, thereby cutting off or substantially reducing the gain of channel 2.

In the presence of input signal, therefore, significant output signal is contributed to the succeeding circuitry, (e.g., limiter) by only one channel, and system performance is practically unaffected by the presence of other filters and associated components of the remaining channels during signal translation. In the absence of signal, the output noise power from the summing circuit 20, to which the output signal of each IF amplifier is applied, is 3 db greater (for two channels) than would be present if only one channel were employed. This increase in threshold attributable to noise and multi-channel operation implies that a greater signal-to-noise ratio is required to capture the system than is necessary for single channel operation. However, since capture is effected with a signal-to-noise ratio much lower than that required for satisfactory communication, this fact is of no operational consequence.

It is apparent from the illustration and description of the embodiment of FIG. 1 that the AGC amplifiers may be replaced by other means for switching or gating the captured channel to a signal-passing condition and for cutting off or severely limiting the signal translating capabilities of the remaining channels, depending upon the bandwidth of the received signal, if the satellite is to be operated with one ground system at a time. Where simultaneous satellite operation with two or more ground systems is desired, i.e., a simultaneous multiple access capability, the cut-off characteristic of each AGC amplifier may be made relatively shallow, and allocation of satellite power between the two systems made dependent upon relative intensities of the satellite-received signals by using the AGC voltages to set limiter thresholds on the individual channels. Moreover, it will be observed that limiters 35–1, 35–2, . . . , 35–*n*, may be inserted in each channel as shown in FIG. 1 such that if the received signals exceed a preselected threshold, substantially equal amounts of satellite power (or, if desired, unequal allocations of power on a predetermined basis) may be radiated for each system. If, for example, the threshold of thresholds 35–1, 35–2, . . ., 35–*n*, are set equal to one another, equal power output will result for each channel. On the other hand, if the limiter thresholds are controlled by the AGC voltages developed by the channels, the channel power may be allocated on the basis of received signal intensity. Alternatively, a multi-tone limiter may be used at the output of summing network 20 in place of separate limiters in each channel.

Those skilled in the pertinent art will further recognize that appropriate logic networks may be employed in the satellite for assigning priority of one ground system's communications over the other or others. Preempt or override modes of operation may also be provided by the incorporation of an appropriate command receiver in the satellite.

Figure 2:
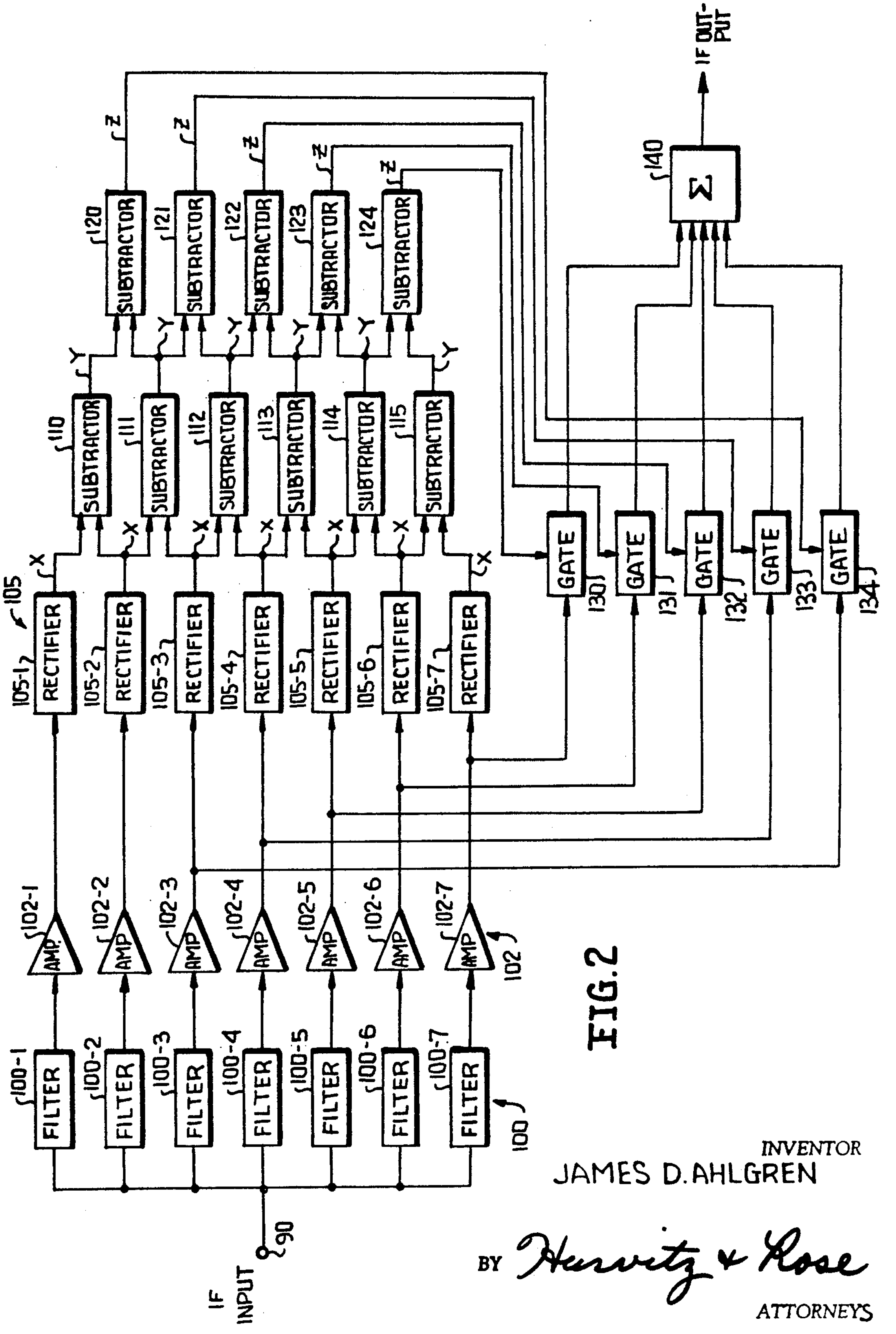
FIG. 2 is a block diagram of another embodiment of the present invention, utilizing filters of differing bandwidth and identical center frequency.

In the embodiment of FIG. 1, sharing of the repeater in multiple access, with repeater power divided on either a predetermined basis or based upon received signal amplitude, requires that the narrow band and wide band channels accept signals transmitted at different frequencies, without substantial overlapping. Another embodiment of the invention, shown in FIG. 2, provides the repeater or transponder with the capability of self-adjustment to the bandwidth of any received signal at a single center frequency. To this end, and with reference now to FIG. 2, a family or set of filter-amplifier combinations, covering the range of anticipated bandwidths, is centered on the preselected single frequency. The filters, designated 100–1, 100–2, . . ., 100–7, have bandwidths successively and sequentially increasing according to a geometric progression. That is, the bandwidth of the *j*th filter (100–*j*) of the set of filters (where *j* is an integer equal to 1, 2, . . ., *n*) is equal or substantially equal to the product of the bandwidth of the first filter (100–1) and the common ratio *r* of successive filters to the *j*th power; or, mathematically, $BW_j = (BW_1)\ (r^j)$. While seven channels, and hence seven filters, are shown, it will be understood that the number of channels may vary depending upon the requirements of the particular system.

The output signal from each filter is fed to a respective IF amplifier 102–1, 102–2, . . ., 102–7, the amplifiers having their relative gains adjusted to be inversely proportional to the relative bandwidths of respective filters (i.e., the product of the filter bandwidth and amplifier gain is the same for all of the channels). Therefore, in the absence of signal the noise outputs of all amplifiers 102–1, 102–2, . . ., 102–7, are balanced. Each amplifier is followed by a rectifier-filter combination 105–1, 105–2, . . ., 105–7, for providing a dc signal at a level representative of the total energy in the output signal of its respective amplifier. Various types of rectifier-filter combinations for this purpose are disclosed at pages 24–31 of the above-referenced textbook "Electronic Circuits." A first set of means for comparing the rectified outputs of pairs of adjacent channels is provided in the form of subtractors 110–115, followed by a second set of comparators (subtractors 120–124) for determining the difference between outputs of adjacent pairs of the initial subtractors. Subtractors 110–115 and 120–124 may be of the same type as subtractors **30–1, 30–2, . . ., 30–*n* of FIG. 1**. It is noted that if there are n signal transmission channels, *n*–1 subtractor (110–115) are required in the first set wherein the *j*th subtractor in the first set receives its input signals from the *j*th and (*j*+ 1)st channels. Similarly, there are *n*–2 subtractors in the second set (120–124), the *j*th subtractor in the second set receiving its two input signals from the *j*th and (*J*+1)st subtractors of the first set.

The output signals of the IF amplifiers in all channels from channel three through channel seven are also fed to separate respective transmission gates 130–134, which are effective to permit or to prevent the passage of channel signal depending upon whether or not a respective control signal is received from subtractors 120–124. Numerous types of transmission gates for this purpose are disclosed in chapter 14 of "Pulse and Digital Circuits" by Millman & Taub, published by McGraw-Hill in 1956. It is noted that there are *n*–2 transmission gates (130–134), where *n* is the number of channels, and that the *j*th transmission gate receives an IF signal from the (*J*+2)nd channel and receives a gating signal (Z) from the *j*th subtractor in the second set of subtractors. It is, of course, apparent that an arrangement of automatic gain controlled amplifiers similar to that shown in FIG. 1, using the output signals of the second set of subtractors as the AGC voltages, may be employed in place of the gates, if desired. The gates are connected to supply input signals to a summing network 140, which in turn supplies the IF output signal of the repeater or transponder.

In operation of the embodiment of FIG. 2, and assuming a noise-like spectrum for the received signal (at input terminal 90), i.e., constant energy density within its bandwidth, the signal is applied in parallel to the set of filters 100, and rectified outputs accordingly appear at point X of each channel. For the character of the IF input signal assumed above, it will be appreciated that the rectified outputs are equal for all filters of narrower bandwidth than the received signal, and diminish in inverse proportion to bandwidth for all filters having bandwidths wider than the received signal. Upon comparison of the rectified output signal (in db) from each filter with that from the filters of narrower and wider bandwidth in the immediately adjacent channels, then, zero difference (i.e., equal rectified outputs) is observed for the channels containing filters of bandwidth less than the received signal, and a common (i.e., constant) difference, because of the geometric progression of filter bandwidths, is observed for channels containing filters of bandwidth greater than the received signal. It is desired to transmit the signal via the channel having the narrowest bandwidth capable of accommodating the entire signal. The preferred channel for passage of signal is therefore that having the narrowest filter which causes a rectified difference to appear at the subtractor.

That the latter channel is the one automatically selected in the embodiment of FIG. 2 will be better understood by concurrent reference to FIGS. 3(a), (b), and (c), where, as an example, the incoming signal is assumed to be of bandwidth lying between (i.e., intermediate) the bandwidths of filters 102–4 and 102–5. The relative rectified output voltage of each filter-amplifier combination, at points X, is shown in FIG. 3(a), bandwidth increasing from left to right as viewed in the Figure. In this particular example, the bandwidths of the first four filters are each narrower than the signal, and the remaining filters are of greater bandwidth than the signal. As previously stated, this results in equal rectified, outputs for filters 100–1 through and including 100–4, and diminishing rectified outputs, in inverse proportion to bandwidth, for filters 100–5 through and including 100–7. FIG. 3(b) depicts the relative voltage versus bandwidth situation existing at the outputs of subtractors 110–115, points Y of FIG. 2. The narrower-than-signal bandwidth filters have rectified output differences of zero, while the wider bandwidth filters have constant finite rectified output differences, arbitrarily designated as voltage difference A. Between these two values lie a range of increasing voltage, shown as the ramp between bandwidths of filter 100–4 and 100–5.

Comparison of the outputs of subtractors 110–115 by subtractors 120–124 reveals that an output voltage will exist at point Z (FIG. 2) only for the subtractor of set 120–124 associated with the filter whose bandwidth is closest to, but wider than, that of the incoming signal. In the present example this difference voltage occurs at the output of subtractor 122, indicating that the signal bandwidth is greater than that of filter 100–4 but less than that of filter 100–5 (FIG. 3(3)). In other words, filter identification and selection is made by the second subtraction process in view of the fact that for the narrower filters 0–0=0 and for the wider filters *A*–*A*=0; only for the desired filter, *A*–0=*A*.

This difference voltage, applied as a control signal to the appropriate gate, causes the gating of the signal through the proper channel, channel 5 in the above example, to summing network 140 and thence as the IF output. The other gates remain in the normally closed condition preventing the passage of signal, owing to the absence of control signal from their respective subtractors.

Additional logic can be added so that when no final subtractor has a signal, the next narrower filter, 102–2 is gated to the output.

While I have described and illustrated one specific embodiment of my invention, it will be clear that variation of the details of construction which are specifically illustrated and described may be resorted to without departing from the true spirit and scope of the invention as defined in the appended claims.

I claim:

1. A circuit for optimizing transmission of an input signal wherein said input signal has a frequency bandwidth which is variable over a predetermined range of frequencies, said circuit comprising:

a plurality of signal transmission channels arranged to receive said input signal in parallel, each channel including a filter and a variable-gain amplifier connected in circuit and providing a channel output signal, said filter having a bandwidth differing from the bandwidths of the filters in each of the other channels and encompassing a preselected portion of said range of frequencies, said amplifier having a nominal gain differing from the nominal gains of the amplifiers in each of the other channels, wherein the product of the filter bandwidth amplifier gain same in each channel, each channel additionally including means for deriving a detected signal having an amplitude which is a function of the amplitude of said channel output signal;

means for mutually comparing said detected signals and providing a control signal having an amplitude at least equal to the highest detected signal amplitude; and control means for each channel for reducing the gain of the amplifier in that channel as a function of the amplitude difference between said control signal and the detected signal from that channel.

2. The circuit according to claim 1 further comprising means for combining the output signals from all of said channels to provide an output signal for said circuit.

3. The circuit according to claim 1 wherein said means for mutually comparing comprises means for summing the amplitudes of all of said detected signals, and wherein said control means for each channel includes a subtractor circuit for providing a gain control signal having an amplitude proportional to the difference between the sum of the amplitudes of all of said detected signals and the amplitude of the detected signal from that channel, said control means further including means for applying said gain control signal to the amplifier of that channel to control the gain thereof such that the larger the gain control signal amplitude the greater the reduction of amplifier gain.

4. The circuit according to claim 1 wherein said means for mutually comparing comprises a peak detector circuit for providing a further signal with an amplitude equal to the highest-amplitude detected signal, and wherein said control means for each channel includes a subtractor circuit for providing a gain control signal having an amplitude proportional to the difference between the amplitude of said further signal and the amplitude of the detected signal from that channel, said control means further including means for applying said gain control signal to the amplifier of that channel for controlling the gain thereof such that the greater the gain control signal amplitude the greater the reduction of amplifier gain.

5. A circuit for optimizing transmission of an input signal wherein said input signal has a frequency bandwidth which is variable over a predetermined range of frequencies said circuit comprising:

a plurality of signal transmission channels arranged to receive said input signal in parallel, each channel including a filter for receiving and filtering said input signal and an amplifier for receiving said input signal after filtering and providing an amplified output signal, said channels being arranged in a sequence wherein the bandwidths of said filters increase in geometric progression and are centered about a common frequency in said predetermined range of frequencies, the gains of said amplifiers being such that the product of filter bandwidth and amplifier gain is the same for each channel, and rectifier-filter means for providing a dc signal at an amplitude representative of the amplitude of said amplified output signal;

a first plurality of subtractor means, each for comparing a respective pair of said dc signals from respective adjacent channels in said sequence and providing a difference signal having an amplitude representative of the amplitude difference between said pair of dc signals, said difference signals being arranged in a further sequence wherein each succeeding difference signal is derived from an adjacent channel pair in which the filter bandwidths are of increasing size;

a second plurality of subtractor means, each for comparing a respective pair of said successive difference signals in said further sequence and providing a gating signal only when the amplitudes of said pair of successive difference signals are substantially different; and a plurality of transmission gates, each responsive to a respective gating signal applied thereto for transmitting a corresponding one of said amplified output signals.

6. A signal transponder capable of automatically narrowing its own frequency bandwidth in accordance with the bandwidth of a received input signal, said transponder comprising:

$n$ signal transmission channels arranged to receive said input signal in parallel, said channels each including a filter for receiving and filtering said input signal, an amplifier for receiving and amplifying the filtered input signal to provide a channel output, and detector means for providing a detected signal having an amplitude representative of the amplitude of said channel output signal, said channels being arranged in a sequence wherein the frequency bandwidths of said filters form a geometric progression and are centered about a common frequency within the bandwidth of said input signal, the gains of said amplifiers being adjusted such that the product of filter bandwidth and amplifier gain is the same for each channel;

$n-1$ subtractor means, each responsive to application of a respective pair of said detected signals thereto for providing a difference signal having an amplitude representative of the amplitude difference between said pair of detected signals, said $n-1$ subtractor means being arranged such the $j$th subtractor means receives its pair of detected signals from the $j$th and $(j+1)$st channel;

$n-2$ further subtractor means, each responsive to application of a respective pair of said difference signals thereto for providing a gating signal only when there is a difference in amplitude between said difference signals, said further subtractor means being arranged such that the jth further subtractor means receives its pair of difference signals from the $j$th and $(j+1)$st of said $n-1$ subtractor means; and $n-2$ transmission gates, each responsive to a respective one of said gating signals applied thereto for transmitting a respective one of said channel output signals, said transmission gates being arranged such that the $j$th transmission gate has applied thereto the gating signal from the $j$th further subtractor means and the channel output signal from the $(j+2)$nd channel.

7. A circuit for optimizing transmission of an input signal wherein said input signal has a frequency bandwidth which is subject to change over a predetermined frequency range, said circuit comprising:

a plurality of signal transmission channels arranged to receive said input signal in parallel, each channel including a filter of preselected bandwidth differing from the bandwidths of the filters in each of the other channels and encompassing a portion of said predetermined frequency range;

control means for controlling passage of said input signal through each channel in accordance with the amplitude of the output signal provided by that channel; and wherein said channels are arranged in a sequence in which the bandwidths of said filters are related in accordance with a predetermined geometric progression and are centered about a common frequency; said control means comprising a plurality of transmission gates, one each connected to receive the output signal from a respective one of said channels, means for monitoring the difference in amplitude between output signals of adjacent pairs of channels in said sequence, and means for inhibiting all but that transmission gate receiving the output signal from the channel having the smallest bandwidth and an output signal which differs in amplitude from the output signals in both adjacent channels in said sequence.

8. A repeater for selectively passing signal in accordance with the signal bandwidth, comprising: a plurality of signal transmission channels; means for applying said signal in parallel to each of said channels; each channel including a filter of preselected bandwidth differing from the bandwidths of the filters in each of the other channels, and an amplifier for amplifying the output signal of the filter in the respective channel, the gain of said amplifier being such that the product of amplifier gain and filter bandwidth is the same for each channel; means for deriving from the output signals of the amplifiers dc voltages which have respective magnitudes proportional to the amplitudes of the respective amplifier output signal, and thereby, to the relative correspondence between respective filter bandwidths and the bandwidth of said signal; means for combining the derived dc voltages in preselected combinations to develop control voltages; and means for applying said control voltages to respective channels to inhibit the passage of said signal therethrough in accordance with the amplitude of said control voltages.

9. The method of automatically adjusting the bandwidth of a system in accordance with the bandwidth of an input signal applied to the system, said method comprising the steps of:

applying said input signal in parallel to a plurality of signal transmission channels having filters of different bandwidths and amplifiers of different nominal gain;

adjusting the nominal gain of said amplifiers such that the product of filter bandwidth and amplifier gain is the same for each channel;

comparing the signals from each channel after filtering and amplification to determine the signal of highest amplitude; and inhibiting transmission in all channels but that from which said signal of highest amplitude was derived.

10. In a system having a plurality of signal transmission channels, each having a filter and an amplifier arranged in sequence, the method of automatically adjusting the transmission bandwidth of said system in accordance with the bandwidth of an input signal applied to the system, said method comprising the steps of:

adjusting the bandwidths of said filters in geometric progression about a common frequency;

adjusting the gains of said amplifiers such that the product of amplifier gain and filter bandwidth is the same for each channel;

applying said input signal in parallel to each of said channels;

comparing the output signals from all of said channels to determine the channel of narrowest bandwidth which provides an output signal differing in amplitude from all channels of narrower bandwidths; and inhibiting signal transmission from all but the channel so determined.

* * * * *